United States Patent
Morrison et al.

(10) Patent No.: US 12,496,472 B1
(45) Date of Patent: Dec. 16, 2025

(54) COLD STERILIZABLE PROTECTIVE MASK

(71) Applicants: Paul-David Morrison, Leander, TX (US); Mark David Vitale, Highlands Ranch, CO (US)

(72) Inventors: Paul-David Morrison, Leander, TX (US); Mark David Vitale, Highlands Ranch, CO (US)

(*) Notice: Subject to any disclaimer, the term of this patent is extended or adjusted under 35 U.S.C. 154(b) by 935 days.

(21) Appl. No.: 17/216,432

(22) Filed: Mar. 29, 2021

Related U.S. Application Data

(60) Provisional application No. 63/003,886, filed on Apr. 1, 2020.

(51) Int. Cl.
| | |
|---|---|
| *A62B 7/10* | (2006.01) |
| *A41D 13/11* | (2006.01) |

(Continued)

(52) U.S. Cl.
CPC ............ *A62B 7/10* (2013.01); *A41D 13/1169* (2013.01); *A61L 2/18* (2013.01); *A61M 16/047* (2013.01); *A61M 16/06* (2013.01); *A61M 16/0605* (2014.02); *A62B 9/00* (2013.01); *A62B 18/02* (2013.01); *A62B 23/02* (2013.01);

(Continued)

(58) Field of Classification Search
CPC .... A41D 13/11–1192; A62B 18/00–10; A62B 7/10; A62B 9/00; A62B 23/02; A61M 16/047; A61M 16/06–0694; A61L 2/18; A61L 2101/24; A61L 2101/34; A61C 19/00; A63B 33/00; B63C 11/12

See application file for complete search history.

(56) References Cited

U.S. PATENT DOCUMENTS 2,998,818 A * 9/1961 Tabor .................. A62B 18/003
128/207.11
4,062,357 A * 12/1977 Laerdal ............. A61M 16/0683
128/206.26

(Continued)

FOREIGN PATENT DOCUMENTS

| DE | 4438512 A1 * | 5/1996 | ............ A61M 16/06 |
| WO | 2013130552 A1 | 9/2013 | |

OTHER PUBLICATIONS

DE-4438512-A1 description (Year: 1996).*

(Continued)

*Primary Examiner* — Timothy A Stanis
*Assistant Examiner* — Kira B Daher
(74) *Attorney, Agent, or Firm* — Anthony V.S. England; Susan M. Maze

(57) ABSTRACT

A protective mask suited for quick regulatory approval and mass production to provide protective use of a wearer includes a mask body having a major portion forming at least one breathing opening configured for holding a filter. The mask body forms a cover contoured to cover, except for the at least one breathing opening, the wearer's mouth and nose when the mask is worn. The mask body further has a flange, wherein a length of the flange extends along a major portion of an edge of the mask body major portion, the flange being configured for pressing against the wearer's face when the mask is worn. The mask body is a material selected from the group consisting of polyethylene terephthalate, polyethylene terephthalate glycol, and poly methyl methacrylate, and combinations thereof.

20 Claims, 6 Drawing Sheets

(51) Int. Cl.
*A61L 2/18* (2006.01)
*A61M 16/04* (2006.01)
*A61M 16/06* (2006.01)
*A62B 9/00* (2006.01)
*A62B 18/02* (2006.01)
*A62B 18/08* (2006.01)
*A62B 23/02* (2006.01)
*A61C 19/00* (2006.01)
*A61L 101/34* (2006.01)

(52) U.S. Cl.
CPC .......... *A61C 19/00* (2013.01); *A61L 2101/34* (2020.08); *A61L 2202/24* (2013.01); *A62B 18/084* (2013.01)

(56) References Cited

U.S. PATENT DOCUMENTS

| | | | | |
|---|---|---|---|---|
| 4,905,686 | A * | 3/1990 | Adams | A61M 16/1075 |
| | | | | 128/207.12 |
| 5,846,082 | A * | 12/1998 | Thornton | A61K 6/90 |
| | | | | 433/48 |
| 9,132,255 | B2 * | 9/2015 | Skipper | A61M 16/0605 |
| 9,655,691 | B2 | 5/2017 | Li et al. | |
| 9,655,693 | B2 | 5/2017 | Li et al. | |
| 9,918,813 | B2 | 3/2018 | Stewart | |
| 10,646,676 | B1 * | 5/2020 | Matich | A61L 31/12 |
| 10,889,049 | B2 * | 1/2021 | Torlay | B29C 51/421 |
| 11,096,764 | B2 * | 8/2021 | Ackel | A61C 19/066 |
| 2004/0055605 | A1 * | 3/2004 | Griesbach, III | A41D 13/1169 |
| | | | | 128/205.27 |
| 2018/0008848 | A1 * | 1/2018 | Moulton | A41D 13/11 |
| 2020/0114178 | A1 * | 4/2020 | Waterford | A62B 18/084 |

OTHER PUBLICATIONS

P.D. Morrison email to 3M, Mar. 26, 2020.
V Vidyashree Nandini, et al., "Alginate impressions: A practical perspective," J Conserv Dent. Jan.-Mar. 2008, 11(1): 37-41. , https://www.ncbi.nlm.nih.gov/pmc/articles/PMC2813082/#:~:text= Alginate is an elastic%2Cirreversible,indispensable part of dental practice.
P.D. Morrison email to Align Technologies, Mar. 30, 2020.
Sabiha S. Bunek, et al., "Crowns: ImpressionMaterials 360°:How to choose the right impression material," Jun. 13, 2013, The Dental Advisor, Issue 4, https://www.dentalproductsreport.com/view/crowns-impression-materials-360-how-choose-right-impression-material.
"Impression Material an Overview," Contemporary Esthetic Dentistry, 2012, https://www.sciencedirect.com/topics/medicine-and-dentistry/impression-material.
P.D. Morrison email to MIT, Apr. 4, 2020.
Sam Simos, DDS, "Three Impression Material Classifications: A Comparison," Dentistry Today, Feb. 28, 2017, https://www.dentistrytoday.com/dental-materials/10276-three-impression-material-classifications-a-comparison?tmpl=component&print=1.

* cited by examiner

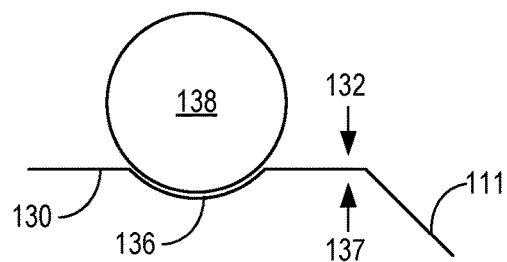
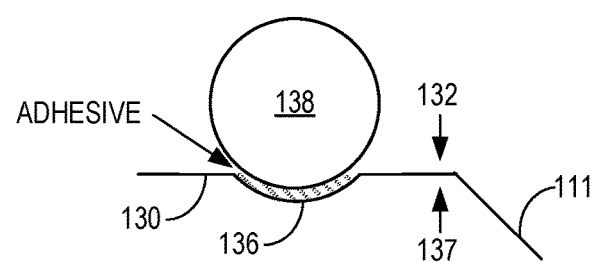
FIG. 1B  FIG. 1C
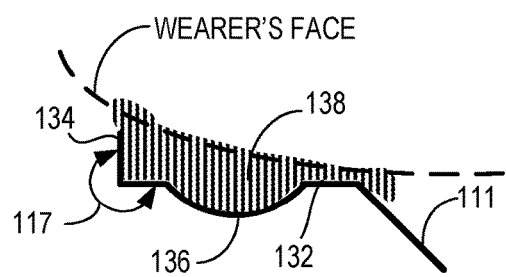
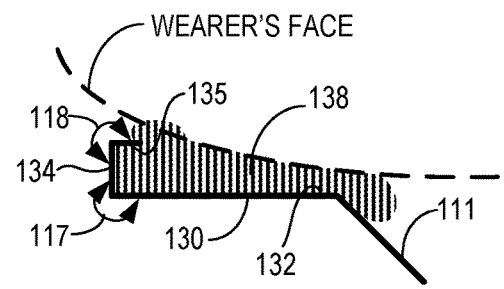
FIG. 1D  FIG. 1E
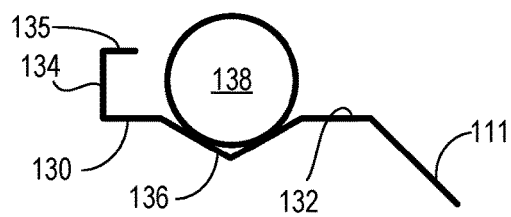
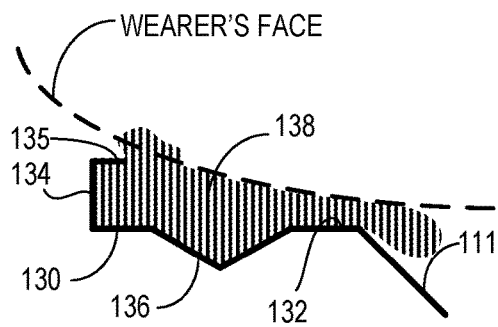
FIG. 1F  FIG. 1G

COLD STERILIZABLE PROTECTIVE MASK

BACKGROUND

The present invention generally relates to protective masks for healthcare providers, military personnel, emergency responders and in particular, to protective facemasks suitable for cold sterilization.

The term "cold sterilization" is used herein to denote immersion of items in a sterilant solution, such as glutaraldehyde or alcohol, for a predetermined period of time to remove, kill, or deactivate all forms of life (in particular microorganisms). The term "heat sterilization" is used herein to denote the use of heat to remove, kill, or deactivate all forms of life. An autoclave, for example, uses elevated temperature and pressure to perform heat sterilization.

BRIEF DESCRIPTION OF THE DRAWINGS

Features and advantages of the present invention will be more readily understood with reference to the attached figures and following description, wherein:

FIG. 1B illustrates details of a cross section of a cold sterilizable mask major portion, flange, groove, and uncompressed sealing material, according to embodiments of the present invention;

FIG. 1C illustrates details of a cross section of a cold sterilizable mask major portion, flange, groove, uncompressed sealing material, and adhesive, according to embodiments of the present invention;

FIG. 1D illustrates details of a cross section of a cold sterilizable mask major portion, flange first surface, groove, flange second surface, and compressed sealing material according to embodiments of the present invention;

FIG. 1E illustrates details of a cross section of a cold sterilizable mask major portion, flange first surface, flange second surface, flange third surface, and compressed sealing material, according to embodiments of the present invention;

FIG. 1F illustrates details of a cross section of a cold sterilizable mask major portion, flange first surface, flange second surface, flange third surface, groove, and uncompressed sealing material, according to embodiments of the present invention;

FIG. 1G illustrates details of a cross section of a cold sterilizable mask major portion, flange first surface, flange second surface, flange third surface, groove, and compressed sealing material, according to embodiments of the present invention;

DETAILED DESCRIPTION

Figure 1:
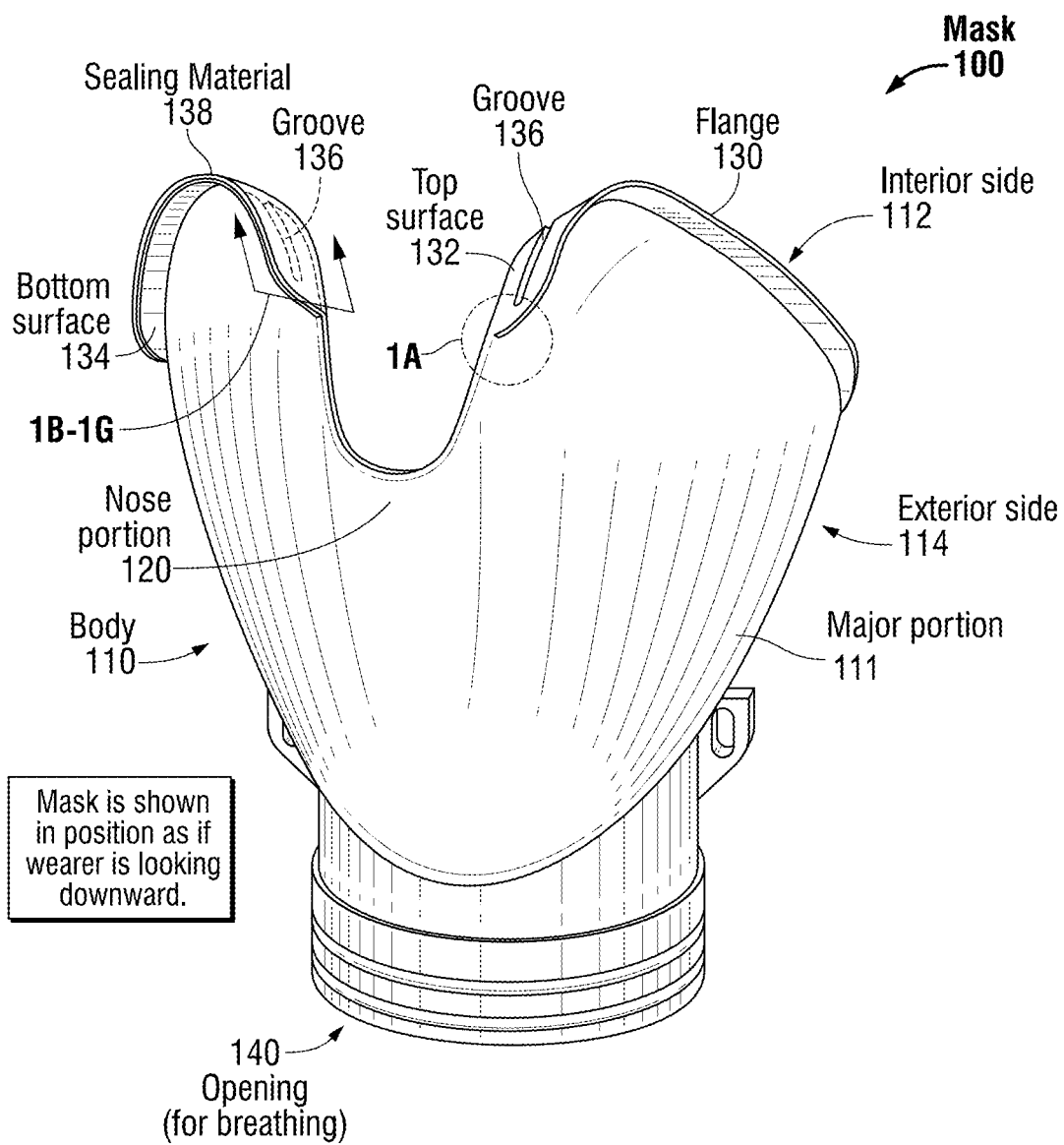
FIG. 1 illustrates a cold sterilizable mask body, according to embodiments of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

When made from materials that are approved by the United States Food and Drug Administration ("FDA") for dental applications, e.g., applications such as sealing dentures, forming dentures, and forming dental appliances for realigning teeth (commonly known as splints), protective facemasks may be more readily approved by the Food and Drug Administration for medical purposes, such as prevention of infectious disease. According to embodiments of the present invention, a mask body of a protective mask is any of the following materials:

Polyethylene terephthalate (PET), which is the most common thermoplastic polymer resin of the polyester family. In addition to dental applications, it is commonly used in fibers for clothing, containers for liquids and foods, thermoforming for manufacturing, and in combination with glass fiber for engineering resins.

Polyethylene terephthalate glycol (PETG), which is a thermoplastic polyester that provides significant chemical resistance, durability, and excellent formability for manufacturing. Because PETG can be easily vacuum and pressure-formed, as well as heat-bent due to its low forming temperatures, it is popular for consumer and commercial applications in addition to dental applications, particularly those that involve 3D printing, or other heat-forming manufacturing techniques. Additionally, PETG is well-suited for fabrication techniques like die cutting, routing, and bending.

Poly Methyl Methacrylate (PMMA), which is transparent and is also known as acrylic, acrylic glass, or plexiglass, as well as by the trade names Crylux, Plexiglas, Acrylite, Astariglas, Lucite, Perclax, and Perspex, among others. In addition to dental applications, PMMA is often used in sheet form as a lightweight or shatter-resistant alternative to glass. The same material can be used as a casting resin for dental purposes or in inks and coatings, among many other uses. Although it is not silica-based, PMMA is often technically classified as a type of glass since it is a non-crystalline vitreous substance. Accordingly, PMMA has historically been designated occasionally as acrylic glass. Chemically, it is the synthetic polymer of methyl methacrylate.

More generally, the mask body may be formed of any material, such as the above, for example, that has been approved by the FDA for a dental application. Preferably the material is well suited for cold sterilization.

In some embodiments, the mask body is relatively more rigid than elastomeric materials commonly used to manufacture industrial respirators.

Suitable materials for mask body 110 of the present invention have physical properties such as the following:

Reduced porosity
Ductile
Elastic
Malleable
Undergo plastic deformation

Mask body 110 materials preferably have the following chemical properties:

Corrosion resistant
Low reactivity

Mask body 110 materials are preferably formable, castable and machinable.

Mask body 110 materials preferably have the following mechanical properties.

Low brittleness
Low creep
Durable
Flexible
Plastic

The mask body can be fabricated using a variety of methods. For example, methods for making mask body 110 may include:

a. Thermoforming sheet material, such as PMMA, which is conventionally used for splints or smile aligners (such as in the Invisalign products for teeth straightening). The material may be formed into mask body 110 by a molding process that includes heat and vacuum or other pressure for conforming a 0.5 mm to 1.5 mm thick piece of the material to a mold, wherein the material cools to a substantially rigid, mask shape after the molding process. Depending on the thermoform material selected and its thickness, the material may, alternatively, provide a somewhat flexible mask shape, although rigid yet flexible enough to form a secure seal. See discussion of sealing material herein below.

b. Three dimensional printing using CDLM, DLP or other three dimensional printers, where dental resin conventionally used for casting and molds, surgical guides, denture base and tooth material, is three dimensional printed into a rigid, 0.5 mm to 1.5 mm thick mask shape.

c. Injection molding acrylic dental resin, forming mask body 110 by injection into a mold with at least one transparent surface and light cured into a rigid, 0.5 mm to 1.5 mm thick shape. That is, for faster production dental resin material can be formed into a rigid mask shape using traditional casting methods and light curing or heat curing, as traditional dentures are made.

Figure 2:
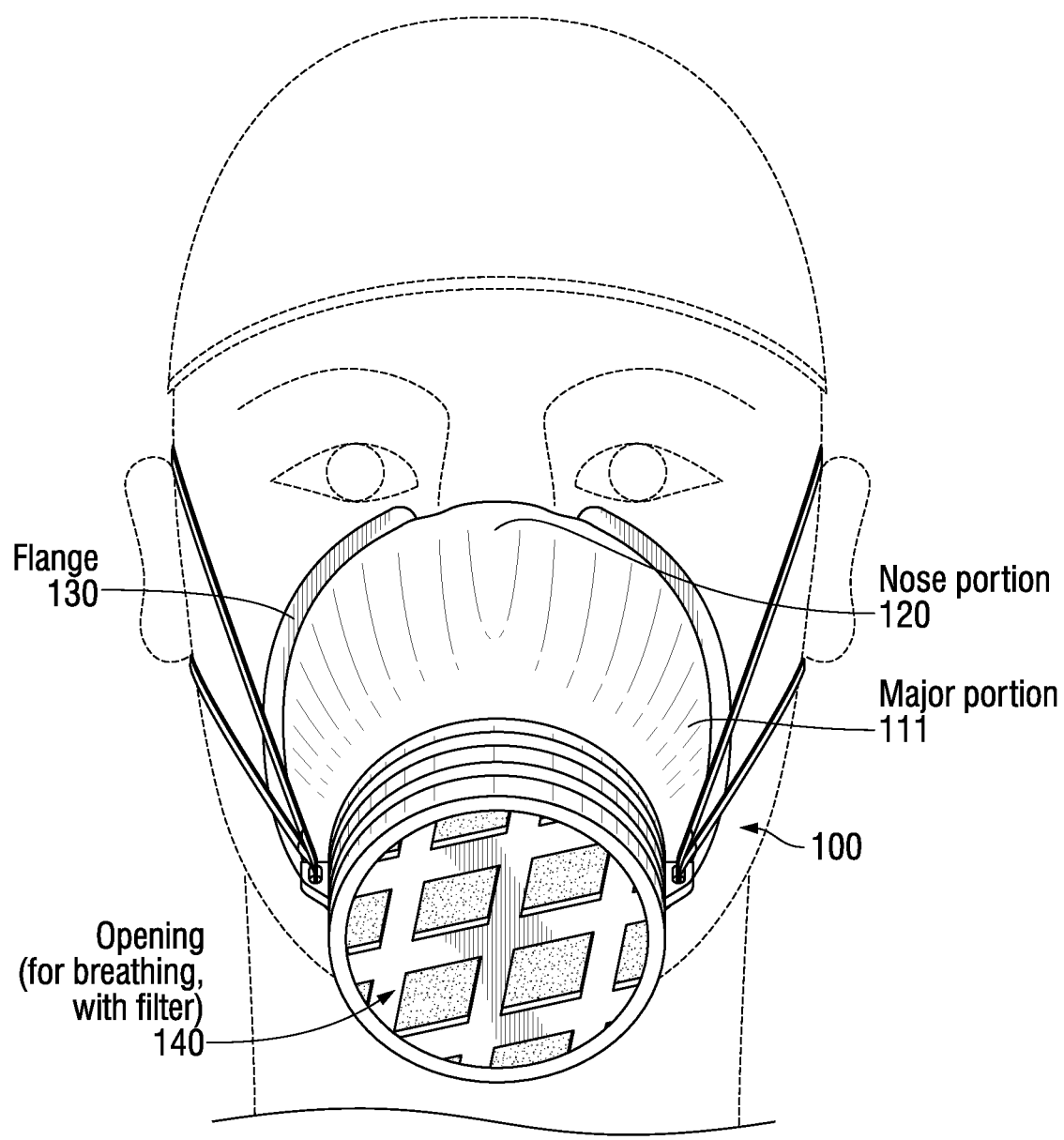
FIG. 2 illustrates a cold sterilizable mask fitted to a wearer's face, according to embodiments of the present invention.

Referring now to FIGS. 1 and 2, in one embodiment of the present invention, mask body 110 has a major portion 111 contoured to accommodate the wearer's mouth and nose when mask 100 is worn, i.e., providing a cover for the wearer's mouth and nose within an interior side 112 of mask body 110 (except for one or more openings 140 for filtered breathing), wherein major portion 111 is curved or otherwise shaped to extend away from the wearer's face, i.e., on an exterior side 114, when the mask is worn on the wearer's face (as shown in FIG. 2).

Mask body 110 is configured to seal against the face of a wearer at least partly by an included flange 130. That is, flange 130 extends along an edge of mask body major portion 111 and is configured to provide a contact surface of mask body 110 for pressing against the wearer's face when mask 100 is worn. Flange 130 forms a groove 136 along its length for receiving a sealing material 138 to aid in making the seal between mask body 110 and the wearer's face when the mask is worn. In other embodiments, groove 136 may be omitted.

Mask body 110 also includes a nose portion 120 in a shape configured to accommodate a wearer's nose. In one embodiment of the present invention as shown in FIG. 1, flange 130 does not extend along the edge of nose portion 120. Accordingly, in such an embodiment, nose portion is configured to fit against a portion of the wearer's nose, e.g., against the bridge of the nose, or, alternatively, just below the bridge and well above the tip of the nose, such that when worn, a substantial surface of nose portion 120 of mask 100 closely contacts the wearer's nose.

Flange 130 has a top surface 132 (also referred to as a first surface) and a bottom surface 137, as shown. Flange 130 surface 132 faces a wearer's face when mask 100 is worn and provides a press fit by surface 132 contacting the face wherever nose portion 120 does not contact the wearer's nose. Thus, flange 130 surface 132 and nose portion 120 of mask body 110 together form a seal against a wearer's face. In an embodiment, flange 130 is 8.0 mm wide+/−2.0 mm and 1.0 mm thick+/−0.50 mm. That is, in one embodiment, surface 132 is 8.0 mm wide, whereas in other embodiments surface 132 is wider or narrower but generally differs in width by no more than 2.0 mm. Likewise, in an embodiment, the distance between surfaces 132 and 137 is 1.0 mm in one embodiment, whereas in others this thickness is greater or less, but generally the thickness in various embodiments differs by no more than 0.50 mm.

The at least one opening 140 is for breathing by the wearer when mask 100 is worn and is formed by the major portion 111 of mask body 110. Each opening 140 is configured for holding a disposable filter. Since mask body 110 is sealed against the wearer's face when mask 100 is worn, breathing is through a filter in each of the at least one openings 140.

In one embodiment of the present invention, flange 130 may continue around the entire edge of mask body 110, i.e., including nose portion 120, wherein flange 130 is configured such that surface 132 faces a wearer's face for a press fit when worn by surface 132 contacting the face, including the wearer's nose (such as the bridge of the nose, for example), so that flange 130 surface 132 forms a seal against a wearer's face regardless of whether any other part of mask 100 contacts the nose.

Regardless of whether the mask is configured to seal against a wearer's face solely by flange 130 or partly by flange 130 and partly by nose portion 120 of mask 100, mask body 110 is shaped to provide one or more openings for breathing, in which a replaceable filter is sealed.

Figure 1A:
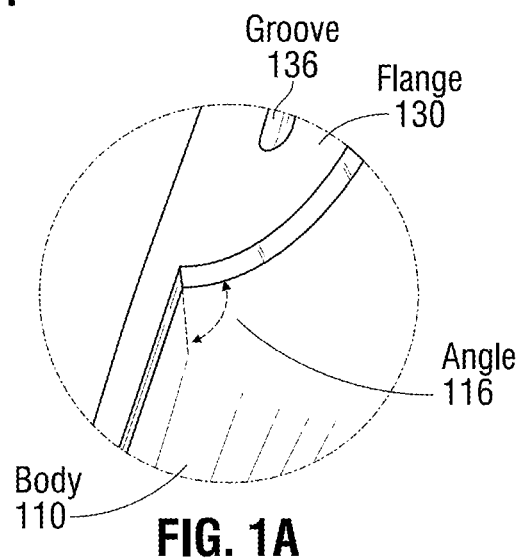
FIG. 1A illustrates details of the angle between a cold sterilizable mask body as shown opposite a top surface of its flange, according to embodiments of the present invention.

Referring now to FIG. 1A, flange 130 may extend from mask body 110 such that an angle 116 between bottom surface 137 and body 110 is 90°+/−45°, wherein the angle may vary substantially within this range in different portions of mask body 110 so as to provide maximum contact with a wearer's face. That is, in an embodiment, angle 116 is not perpendicular to mask body 110 along the entire length of flange 130, but angles toward or away from the wearer's face to make a better seal. For example, flange 130 is more upswept, i.e., angle 116 is >90°, near the upper portion of mask body 110, near nose portion 120, for example. Angle 116 is closer to 90° near the sides of mask body 110, near where it meets the wearer's cheeks, for example. Flange 130 is more down swept, i.e., angle 116 is <90° near the bottom of mask 100, near where it meets the wearer's chin, for example.

The seal formed by pressing flange 130 surface 132 (and possibly also nose portion 120, depending on the embodiment) against a wearer's face may be greatly enhanced by providing flexible sealing material 138 approximately 5.0 mm to 8.0 mm thick on surface 132 (and possibly also on nose portion 120, depending on the embodiment). In an embodiment, sealing material 138 may protrude above top surface 132.

In various ones of the embodiments of the invention described herein, flexible sealing material 138 may be a paste when applied during mask manufacture. In an embodiment, the paste may be applied after manufacture of mask body 110 by a user prior to wearing mask 100, such as by squeezing the paste from a tube or syringe, for example. "Paste," as used herein, means a viscous liquid or a colloid, such as a gel or an emulsion. Such a paste may harden at least somewhat after it is applied, so that it becomes a solid, which may or may not be flexible, depending on the embodiment. In an embodiment wherein a user applies paste sealing material 138, the user may then remove the paste prior to cold sterilizing mask body 110 and reapply the paste before the next use. In an embodiment, sealing material 138 may be a flexible, solid material, that is pre-formed for initial application and affixed to flange 130 using an adhesive.

Paste forms and flexible solid forms of sealing material 138 may be any of the following:

- Polyvinyl siloxanes (PVS), which are known for their excellent elasticity, high tear strength and stability. PVS's are the most commonly used impression material in the United States. They are available in a wide range of viscosities, colors, scents/tastes and can be used with all impression techniques. Additional characteristics include long shelf-life, adequate working times, fast set times and dimensional stability. Although PVS's meet many of the criteria for an ideal dental impression material, they are inherently hydrophobic, which can reduce impression accuracy in a moist or wet environment of dental use. Surfactants are often added to PVS materials to make them more hydrophilic, resulting in better dental impressions.
- Polyethers, which are known for their hydrophilic properties and good flowability, have been in the dental market for more than 40 years. While they have earned a reputation for being too rigid and bitter in taste, enhancements over time have made them more desirable. Polyethers remain popular among a large number of clinicians mainly because of their inherent hydrophilic nature. The water-loving elastomeric material provides superior wettability and adherence to preparations, resulting in good surface detail. Their use is ideal in situations where it is difficult to maintain a dry environment or when tissue management is difficult.
- Polyether/PVS hybrids, which combine the best features of both materials.
- Irreversible hydrocolloids, such as sodium alginate More generally, sealing material 138 may be any that has been approved by the FDA for a dental application, which may include any of those listed above. Elastomeric materials are advantageous in one aspect, because they tend to conform to the wearer's face, and they can be cold sterilized for re-use. They are not, however, well suited for autoclave sterilization for re-use to the extent that they cannot withstand the heat. Some thermoplastic polymers can be autoclaved, on the other hand, and are well suited for both autoclave and cold sterilization and re-use. Some embodiments of the present invention are suitable for heat sterilization and others are only suitable for cold sterilization, depending on the materials selected for the mask body (and the sealing material, unless the sealing material is removed prior to sterilization).

In an embodiment of the present invention, flange surface 132 may form a groove 136 (e.g., V-Groove or U-Groove, etc.). In an embodiment, groove 136 is 3.0 mm deep and 5.0 mm wide along its length for capturing a portion of sealing material 138, thereby helping to retain sealing material 138. (In FIG. 1, sealing material 138 is shown flush on surface 132 on only one side of nose portion 120, which is merely so that the relatively more narrow groove 136 is more clearly visible on the other side of nose portion 120).

FIG. 1B depicts a cross section of major portion 111, flange 130, and groove 136 in an embodiment where groove 136 is a U-Groove. FIG. 1B further depicts a cross section of sealing material 138 laid in groove 136 prior to compression against a wearer's face. In various embodiments, the depth of groove 136 may differ, but generally differs by no more than 3.0 mm. Likewise, the width of groove 136 may differ in various embodiments, but generally differs by no more than 3.0 mm. However, in another embodiment, the entire width of surface 132 may be formed to be V or U shaped, instead of merely having groove 136 in only a portion of surface 132.

FIG. 1C illustrates a sealing material 138 and groove 136 combination, where sealing material 138 is held in place with an adhesive. Use of adhesive may be more suitable for an embodiment in which sealing material 138 is a pre-formed, solid material, but adhesive use is not limited to solid sealing material.

Referring to FIG. 1D, according to an embodiment, flange 130 may also include a second surface 134 along its length, which provides a lip to further help retain and maintain a thicker layer of sealing material 138. That is, first surface 132 and second surface 134 provide legs that form an "L" in cross section in the embodiment illustrated, where surface 134 extends toward a wearer's face when mask 100 is worn. The flange in FIG. 1D further includes a "U" shaped groove 136. In FIG. 1D, flange 130 is depicted relative to mask major portion 111 and a wearer's face, with sealing material 138 shown compressed between the wearer's face and flange 130. Accordingly, sealing material 138 may extend to, and adhere to, surfaces 132 and 134, thereby providing more secure adhesion and less leakage. (Groove 136 is not shown in FIG. 1E merely for simplicity of illustration. However, groove 136 may be provided.) In the "L" configuration illustrated, angle 117 formed between first surface 132 and second surface 134 is 90° In other embodiments, angle 117 may differ from 90°. For example, angle 117 may be from 90° to 110° in various embodiments. In an embodiment, second surface 134 is 3 mm wide. In other embodiments, surface 134 width may differ, but generally by no more than 3 mm No new m included in this amendment, which merely corrects a typographical error.

Referring to FIG. 1E, in an embodiment, the edge of second surface 134, may be folded over, so to speak, so that a third surface 135 is provided to form a "J" cross section with angle 118 between second surface 134 and third surface 135. (Groove 136 is not shown in the example configuration of FIG. 1E. However, groove 136 may be provided.) In FIG. 1E, flange 130 is depicted relative to mask major portion 111 and a wearer's face, with sealing material 138 shown compressed between the wearer's face and flange 130. Accordingly, sealing material 138 may extend to, and adhere to, surfaces 132 and 134, and 135, thereby providing more secure adhesion and less leakage. Although angle 118 is depicted as a 90° angle in FIG. 1E, angle 118 may differ. For example, angle 118 may be from 90° to 110° in various embodiments. In an embodiment, third surface 135 is 3 mm wide. In other embodiments, surface 135 width may differ, but generally by no more than 2 mm.

Figure 3:
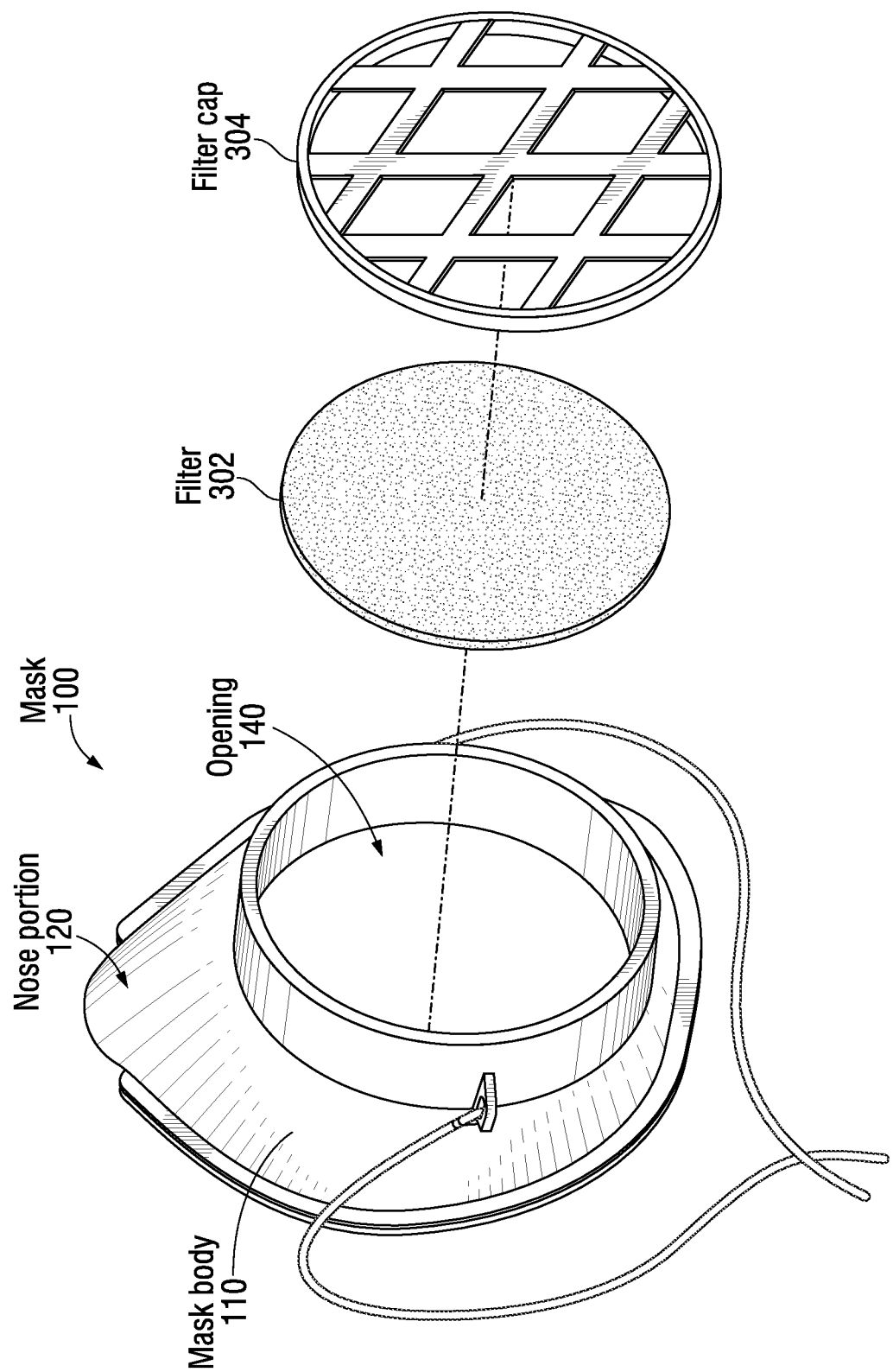
FIG. 3 is an exploded diagram showing a cold sterilizable mask shaped to provide one opening for breathing, a suitable filter, and a filter cap, according to embodiments of the present invention.
Figure 4:
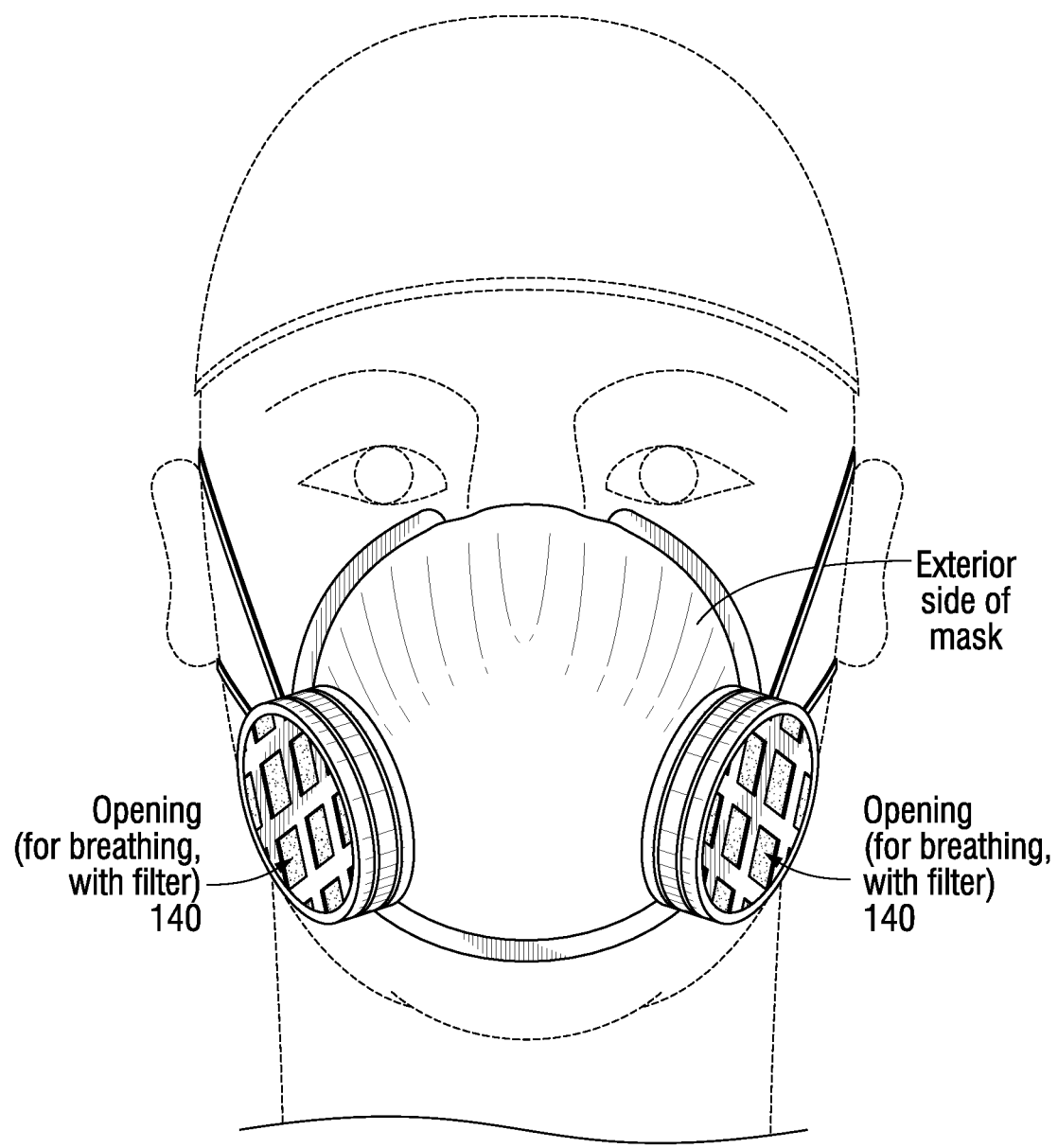
FIG. 4 illustrates a cold sterilizable mask fitted to a wearer's face and shaped to provide two openings for breathing, according to embodiments of the present invention.

Referring now to FIGS. 2 and 3, due to the seal provided against a wearer's face when mask 100 is worn, breathing is solely through opening 140 formed by mask body 110 in which a suitable filter 302 is sealed. Mask body 110 may form a breathing opening in front of nose portion 120 as in FIGS. 2 and 3. Alternatively, mask body 110 may form openings 140 on both sides of nose portion 120, for example, as shown in FIG. 4. Breathing opening 140 is circular as shown in FIGS. 1-4, but It can take any desirable shape. The size of breathing opening 140 may also be larger or smaller than depicted in FIGS. 1-4. Location(s) of opening(s) 140 may also vary from those depicted in the illustrative figures herein.

Referring to FIG. 3, filter cap 304 and mask body 110, as shown in the illustrated embodiment of the present invention, reversibly attach to each other by any suitable method known in the art. Preferred methods include a screw top cap or a snapping filter cap 304 onto the mask body by engaging snapping elements together. Once filter cap 304 is removed, a used filter 302 may be removed and replaced. Filter 302 material may be, for example, a polymeric melt blown fiber. Filter cap 304 may be completely removable from mask body 110 or partly removable by being hinged or tethered to mask body 110.

Referring to FIGS. 2 and 4, mask 100 may be secured to the wearer's face using one or more straps attached to connectors molded onto each mask body 110. The straps may be adjustable for wearer comfort and proper seal. The strap or straps may be manufactured from an elastically compliant material in one or more pieces. The one or more straps join behind the wearer's head with an attachment means such as a slide mechanism or other adjustment means thereby allowing the wearer to adjust the straps for maximum comfort. When worn, the positioning of mask 100, the positioning of the strap attachment point, and the adjustable nature of the pressure generated by the straps keep mask 100 in contact with the wearer's face for proper seal.

In one embodiment of the present invention, the mask may be custom shaped to fit the face of an individual wearer. For the custom fit, according to the embodiment of the present invention, a user supplies data from a three dimensional ("3D") scan of their face in. STL or other file format type, which is done by using an existing or custom app on a smartphone, tablet, computer or other digital device with a digital camera or scanner or by using an industrial blue or white light scanner to scan their face and create the file for submission. A manufacturer uses the user-supplied data from the 3D scan to make a custom shape mold for thermoforming, or other methods, mask body 110 using one of the materials and methods described above, such that the mask more precisely fits the user's individual face.

A user may also choose custom aesthetic designs on their custom mask, which may include changes to the geometry or shape of the mask that does not affect form fit or function. A user may also choose to have logos printed, painted, or added to the mask using other methods, which are changes to colors only.

Figure 5:
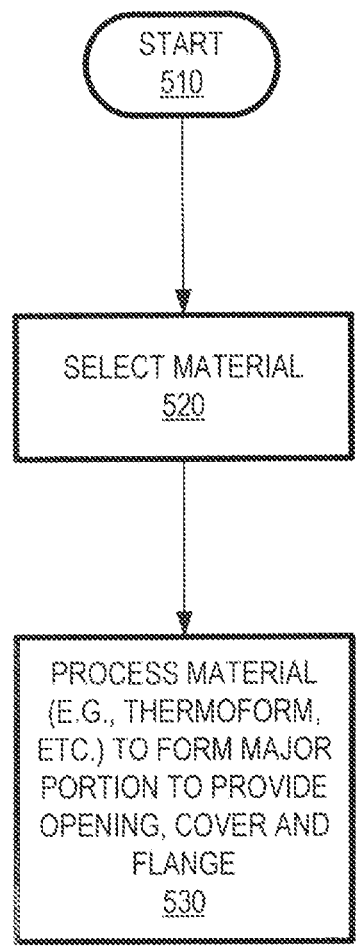
FIG. 5 is a flow chart illustrating a method for manufacturing a cold sterilizable mask, according to embodiments of the present invention.

Referring now to FIG. 5, a method for manufacturing a protective mask suited for quick regulatory approval and mass production to provide protective use of a wearer starts at 510. At 520 a material is selected for a mask body from the group consisting of polyethylene terephthalate, polyethylene terephthalate glycol, and poly methyl methacrylate, and combinations thereof. At 530 the material is processed to form the mask body, including forming a major portion of the mask body configured to provide at least one breathing opening for holding a filter and also configured to provide a cover contoured to cover, except for the at least one breathing opening, a wearer's mouth and nose when the mask is worn. Processing the material further includes forming a flange, wherein a length of the flange extends along a major portion of an edge of the mask body major portion, the flange being configured for pressing against the wearer's face when the mask is worn.

From the disclosure herein, it should be appreciated that an embodiment of the present invention provides a protective mask suited for quick regulatory approval and mass production to provide protective use of a wearer. The protective mask may include a mask body having a major portion forming at least one breathing opening configured for holding a filter and forming a cover contoured to cover, except for the at least one breathing opening, the wearer's mouth and nose when the mask is worn. The mask body may include a flange, wherein a length of the flange extends along a major portion of an edge of the mask body major portion, the flange being configured for pressing against the wearer's face when the mask is worn. The mask body may be a material selected from the group consisting of polyethylene terephthalate, polyethylene terephthalate glycol, and poly methyl methacrylate, and combinations thereof. In another aspect, the mask body material may be approved by the United States Food and Drug Administration for a dental application.

In some embodiments of the present application, the protective mask may include a paste sealing material on the flange, which may be applied during manufacture or, alternatively, by the user before wearing the manufactured mask body. In some embodiments, the sealing material may be selected from the group consisting of, or alternatively, may include material selected from the group consisting of, polyvinyl siloxane, polyether, polyether/polyvinyl siloxane hybrid, and irreversible hydrocolloid, and combinations thereof. In some embodiments, the paste may be approved by the FDA for a dental application. (Alternatively, the protective mask may include a sealing material of a flexible, pre-formed, solid, material fixed to the flange by an adhesive.)

In another aspect, the flange may form a groove along its length for receiving the paste sealing material to aid in making a seal between the mask body and the wearer's face when the mask is worn. The groove has a width and a depth. In an embodiment, the width is greater than the depth.

In embodiments, the mask body may include a nose portion configured to fit against the wearer's nose to aid in making the seal between the mask body and the wearer's face when the mask is worn. A paste sealing material may be included on the nose portion to further aid in making the seal. The flange may include a portion that extends along an edge of the nose portion, wherein the flange along the nose portion edge is configured to fit against the wearer's nose to aid in making the seal.

In embodiments, the flange may include a first, top surface in which a groove is formed, wherein the first surface faces the wearer's face when the mask is worn and may include a second surface that extends away from the first surface to provide a lip for the first surface, the lip extending toward the wearer's face when the mask is worn. Accordingly, when a paste sealing material is applied to the flange, the lip provided by the second surface enables the paste to build up on the flange's first surface to a greater depth than the paste would build up without the lip. Also, an edge of the second surface distal to the first surface may be folded over to provide a third surface, wherein the first, second, and third surfaces form a J cross section.

In embodiments, the protective mask may include, for each of the at least one openings, a filter and a filter cap for sealing and retaining the filter.

In embodiments, the mask body is cold sterilizable.

Some embodiments of the present include a method for manufacturing a protective mask suited for quick regulatory approval and mass production to provide protective use of a wearer, including forming a mask body from a material selected from the group consisting of polyethylene terephthalate, polyethylene terephthalate glycol, and poly methyl methacrylate, and combinations thereof. Forming the mask body may include forming a major portion of the mask body configured to provide at least one breathing opening for holding a filter and also configured to provide a cover contoured to cover, except for the at least one breathing opening, a wearer's mouth and nose when the mask is worn. Forming the mask body may further include forming a flange, wherein a length of the flange extends along a major portion of an edge of the mask body major portion, the flange being configured for pressing against the wearer's face when the mask is worn. In some embodiments, the mask body may be poly methyl methacrylate, and forming the mask may include thermoforming of the polyethylene poly methyl methacrylate. In other embodiments, the mask body is poly methyl methacrylate, and forming the mask may include casting of the poly methyl methacrylate. In other embodiments, the mask body is poly methyl methacrylate, and forming the mask may include three dimensional printing of the poly methyl methacrylate.

While this specification contains many specifics, these should not be construed as limitations on the scope of the invention or of what can be claimed, but rather as descriptions of features specific to particular implementations of the invention. In this regard, dimensions are specified herein above for various features, including ranges and limits of variations. While these dimensions are applicable to particular embodiments of the present invention, they should not be construed as imitations on the overall scope of the invention or of what can be claimed.

Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations (also referred to as "actions") may be depicted in the drawings and recited in the claims in a particular order, this should not be understood as requiring that such operations be performed in that particular order or that all such operations be performed. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, no element described herein is required for the practice of the invention unless expressly described as essential or critical.

The corresponding structures, materials, acts, and equivalents of all means or step plus function elements in the claims below are intended to include any structure, material, or act for performing the function in combination with other claimed elements as specifically claimed.

It should be appreciated that the particular implementations shown and described herein are illustrative of the invention and its best mode and are not intended to otherwise limit the scope of the present invention in any way. Other variations are within the scope of the following claims. Many modifications and variations will be apparent to those of ordinary skill in the art without departing from the scope and spirit of the invention. The embodiments presented herein were chosen and described in order to best explain the principles of the invention and the practical application and to enable others of ordinary skill in the art to understand the invention for various embodiments with various modifications as are suited to the particular use contemplated. The description of the present invention has been presented for purposes of illustration and description but is not intended to be exhaustive or limited to the invention in the form disclosed.

What is claimed is:

1. A protective mask to provide protective use of a wearer, wherein the protective mask includes a mask body having a major portion forming at least one breathing opening configured for holding a filter and forming a cover contoured to cover, except for the at least one breathing opening, the wearer's mouth and nose when the mask is worn, the mask body having a flange, wherein a length of the flange extends along a major portion of an edge of the mask body major portion, the flange being configured for receiving a sealing material and pressing the received sealing material against the wearer's face when the mask is worn, and wherein the flange includes first and second surfaces, the first surface being configured to face the wearer's face when the mask is worn and the second surface being rigid and configured to provide a lip extending from the first surface toward the wearer's face when the mask is worn, so that with the sealing material on the first surface and extending to the lip, the first surface presses the sealing material directly against the wearer's face when the mask is worn, wherein the lip provided by the second, rigid surface enables the sealing material to build up on the flange's first surface to a greater depth directly against the wearer's face than the sealing material would build up without the lip.

2. The protective mask of claim 1, wherein the flange forms a groove along its length for receiving the sealing material to aid in making a seal between the mask body and the wearer's face when the mask is worn.

3. The protective mask of claim 1, including the sealing material, wherein the sealing material is hardened.

4. The protective mask of claim 1, wherein the mask body includes a nose portion configured to fit against the wearer's nose to aid in making a seal between the mask body and the wearer's face when the mask is worn.

5. The protective mask of claim 4, wherein when the sealing material is also on the nose portion the sealing material on the nose portion further aids in making the seal between the mask body and the wearer's face when the mask is worn.

6. The protective mask of claim 1, wherein the mask body includes a nose portion and the flange includes a portion that extends along an edge of the nose portion configured to fit against the wearer's nose, wherein when the sealing material is also on the flange along the nose portion edge and the sealing material on the flange portion extending along the edge of the nose portion aids in making the seal between the mask body and the wearer's face when the mask is worn.

7. The protective mask of claim 1, wherein an edge of the second surface distal to the first surface is folded over to provide a third surface, wherein the first, second, and third surfaces form a J cross section.

8. The protective mask of claim 1, wherein the mask body is cold sterilizable.

9. The protective mask of claim 1, wherein the mask body is a material suitable for a dental application.

10. The protective mask of claim 1, including the sealing material, wherein the sealing material is a material suitable for a dental application.

11. The protective mask of claim 1, wherein the flange's first surface is rigid.

12. A protective mask to provide protective use of a wearer, wherein the protective mask includes a mask body, the mask body having a major portion forming at least one breathing opening configured for holding a filter and forming a cover contoured to cover, except for the at least one breathing opening, the wearer's mouth and nose when the mask is worn, and wherein the mask body further includes a flange, wherein a length of the flange extends along a major portion of the mask body major portion, wherein the flange includes a first surface that faces the wearer's face when the mask is worn, that has a first edge connected to an exterior of the mask body major portion and that has a second edge further exterior to the mask body major portion, and the flange includes a second surface having a first edge connected to the second edge of the first surface, wherein the second surface provides a lip for the first surface, the lip extending toward the wearer's face when the mask is worn, so that when a sealing material is applied to the first surface of the flange and the mask is worn, the flange's first surface presses the sealing material at the lip directly against the wearer's face and so that the lip provided by the second surface enables the sealing material to build up on the flange's first surface to a greater depth directly against the wearer's face than the sealing material would build up without the lip.

13. The protective mask of claim 12, wherein an edge of the second surface is folded over to provide a third surface parallel to the first surface, wherein the first, second, and third surfaces form a J cross section.

14. The protective mask of claim 12, including the sealing material, wherein the sealing material is a material suitable for a dental application.

15. The protective mask of claim 12, wherein the flange forms a groove along its length for receiving the sealing material to aid in making a seal between the mask body and the wearer's face when the mask is worn.

16. The protective mask of claim 12, including the sealing material, wherein the sealing material is hardened.

17. The protective mask of claim 12, wherein the mask body is a material suitable for a dental application.

18. The protective mask of claim 17, wherein the flange's first surface is rigid.

19. The protective mask of claim 18, wherein the flange's second surface is rigid.

20. A method for manufacturing a protective mask to provide protective use of a wearer, comprising:
forming a mask body from a material suitable for a dental application, wherein forming the mask body includes:
forming a major portion of the mask body configured to provide at least one breathing opening for holding a filter and also configured to provide a cover contoured to cover, except for the at least one breathing opening, a wearer's mouth and nose when the mask is worn; and
forming a flange, wherein a length of the flange extends along a major portion of an edge of the mask body major portion, the flange being configured for receiving a sealing material and pressing the received sealing material against the wearer's face when the mask is worn, wherein forming the flange includes forming first and second surfaces of the flange, the first surface being configured to face the wearer's face when the mask is worn and the second surface being rigid and configured to provide a lip extending from the first surface toward the wearer's face when the mask is worn, so that when the mask is worn with the sealing material on the first surface and extending to the lip, the first surface presses the sealing material directly against the wearer's face, wherein the lip provided by the second, rigid surface enables the sealing material to build up on the first surface to a greater depth directly against the wearer's face than the sealing material would build up without the lip.

* * * * *